Dec. 21, 1965 A. W. VINAL 3,225,333

DIFFERENTIAL QUANTITIZED STORAGE AND COMPRESSION

Filed Dec. 28, 1961 2 Sheets-Sheet 1

INVENTOR.
ALBERT W. VINAL

BY

Ralph R Barnard

ATTORNEY

United States Patent Office 3,225,333

Patented Dec. 21, 1965

3,225,333

DIFFERENTIAL QUANTITIZED STORAGE AND COMPRESSION

Albert W. Vinal, Owego, N.Y., assignor to International Business Machines Corporation, New York, N.Y., a corporation of New York Filed Dec. 28, 1961, Ser. No. 162,816

15 Claims. (Cl. 340—172.5)

This invention relates to an electrical storage system and more particularly to a new and improved means for sampling time related data represented electrically, eliminating redundant data and storing the reduced data in digital form so that the time related data may be later substantially reproduced.

There are many occasions in the design of electrical digital systems for communication data processing and control systems where it is desired to store a large volume of digitized electrical information for future use. As a practical matter, one of the very significant limitations on future information systems will be the relatively limited storage capacity which is available based on such practical considerations as physical size of the memory, power consumption of the memory and reliability and maintenance considerations associated with the memory.

It has been noted by many who have worked in this technical field that certain blocks of electrical digital information exemplified by a digitized TV picture contain an extremely large amount of redundant information. It has been estimated that a TV scanning system in which a field consists of 1000 lines and there are 1000 points per line, it would take, using present magnetic tape storage systems, a minimum of $N\times10^6$ bits of storage capacity to digitize each point in the scanning field to the resolution represented by $2^N$ quantization levels. However, and depending somewhat upon the nature of the picture in the field being scanned, many successive points on a given line have the same analog value or alternatively, the analog value varies over a very narrow range. Using known techniques, 99% of the data stored could easily be redundant while the remaining 1% has significance in the reproduction of the picture. In terms of storage capacity, the aformentioned $N\times10^6$ bit requirement is really only $N\times10^4$ when considering only the significant data.

At the present time, most of the memories that are being used to store information of a highly redundant type are made up of magnetic tapes and magnetic discs. Each of these storage techniques is known as being suitable for large capacity storage. However, these memories do not permit random access of the data since they require time as one of the selection coordinates in order to store and read digital information. As a result, all of the quantitized information, even that which is redundant, must be stored in proper time so that reproduction and access to the stored information be possible. Random access memories by definition do not have time as a selected coordinate and, therefore, have a necessary operational characteristic for storing a quantitized field of view such as provided by a TV scanning system without necessarily including the redundant information. The information to be stored is initially in analog form and the time at which an analog signal is sampled can, in most scanning systems, be related to the location of the analog signal in the data (picture) field.

Therefore, a primary object of the present invention is to provide a new and improved means for sampling time related data represented electrically, eliminating redundant data and storing the electrical data in digital form so that the time related data may be later substantially reproduced.

It is another object of the present invention to provide a new and improved means for sampling an analog signal, converting that signal to digital information and storing only that digital information which is determined to be significant in reproducing that analog signal in its time relationship with other analog signals.

It is still another object of the present invention to provide a new and improved system for compressing time related electrical digital information to minimize memory capacity and pulse code modulated telemetry bandwidth while also storing a reproducible pattern of information.

It is another object of the present invention to provide a new and improved analog-to-digital sampled data system for compressing and storing data in reproducible form.

It is a further object of the present invention to provide a new and improved means for minimizing the storage capacity of a large volume of time related, highly redundant electrical information.

The objects of the present invention are provided by sampling the magnitude of electrical information at selected intervals, generating a signal corresponding to the time of occurrence of said selected sampling and storing said sampled magnitude in digital form in a random access memory in a particular location along with other identifying digital information, such as the time of sampling whenever the variance of the electrical quantity exceeds a selected value so that the time related electrical information may be read out of memory and reproduced at a later time.

The foregoing and other objects, features and advantages of the present invention will be apparent from the following more particular description of a preferred embodiment of the invention, as illustrated in the accompanying drawings.

Figure 1:
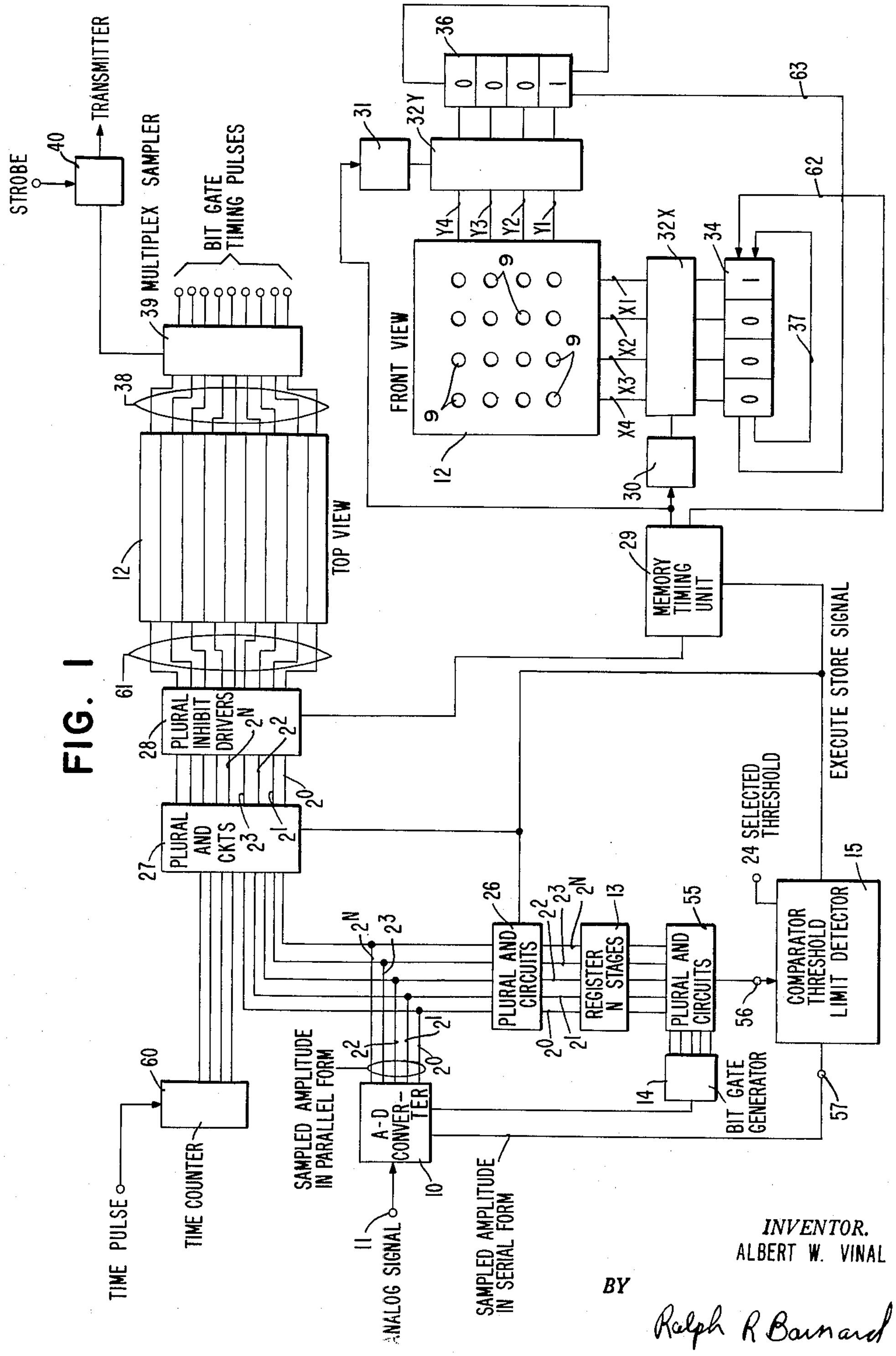
FIG. 1 represents an electrical block diagram of the embodiment of the teachings of the present invention.

Referring to FIG. 1, analog-to-digital converter 10 receives an input electrical sampled analog quantity 11 which it is desired to instantaneously sample and convert to binary digital form. The digital output from converter 10 is the quantity which will be desired to store in a memory location of random access memory 12 if that quantity varies from the quantity stored in register 13 by a selected amount. As shown in the embodiment of the present invention of FIG. 1, the analog-to-digital converter in one of its most practical embodiments provides the electrical binary digital number in both serial and parallel binary form. Such an analog-to-digital converter is well known in the art as shown in FIG. 11–8($a$) on page 489 of a textbook entitled "Digital Computer Components and Circuits " by R. K. Richards, D. Van Nostrand Company, Inc., November 1957. The electrical binary information in serial form is used to compare the magnitude of the converter quantity with the quantity stored in register 13 in a manner to be described hereinafter with greater detail. The parallel electrical binary information must be available in parallel to provide inhibit information to the random access memory 12 if the serial electrical binary information varies from the quantity stored in register 13 by a selected amount. Bit gate generator 14 may be of conventional construction and in response to serial clocking pulses from the analog-to-digital converter 10 acts to provide clocking pulses to plural AND circuits 55 connected to register 13 in bit synchronization with the serial binary output from the analog-to-digital converter. In this fashion, AND circuits 55 in cooperation with bit gate generator 14 function to sample the content of register 13 so that that information may be passed in serial form to one input 56 of comparator-detector 15. The sampled information in serial form is applied in synchronism to the other input 57 of comparator-detector 15.

The details of construction and operation of comparator-detector 15 will be described hereinafter in connection with FIG. 2. In general terms, the comparator-detector compares the reference quantity applied via input 56 with the sampled quantity applied via input 57. If the difference exceeds a selected amount, hereinafter called the threshold represented by the number of pulses applied to an input 24, and execute store signal is derived at the output terminal. The difference between the reference quantity and the sampled quantity may be in either direction (plus or minus). Moreover, the difference (or threshold) at which an execute store signal will occur may be varied by changing the number of pulses which are applied to input 24 during the comparison operation which will be described. It should be noted that the number of pulses applied to input 24 to determine the threshold may be adjusted based on the rate at which the capacity of the memory 12 is or would be exhausted.

The execute store signal from comparator-detector 15 is applied to the memory timing circuit 29 for purposes of initiating a writing operation and is also applied to AND circuit 26 so that the parallel information updates the content of register 13. The writing operation may be described with respect to three functions. The first function is the proper initiation of selected inhibit drivers 28 where each inhibit driver cooperates with an inhibiting means in each plane of the random access memory. Another function is the requirement that the selected word location be coincidentally addressed for writing. Memory address registers 34 and 36 cooperating with transformer switches 32X and 32Y and bidirectional drivers 30 and 31 provide this function. Still another function is that the memory locations be selected in a fixed sequential manner so that the same memory locations can be later interrogated during a readout operation in the same sequence.

As shown in FIG. 1, memory 12 is shown in two views. One is a top view illustrating an exemplary number of planes selected on the basis of the resolution at which the analog sampled is quantitized (shown herein as $2^4$) and the resolution of the identifying time or position information which is stored in the counter 60 (shown herein as $2^3$). The details of how counter 60 operates to store a quantity which identifies the sampled quantity will be described hereinafter in connection with FIGS. 3 and 4. The other view of memory 12 is a front view to illustrate the coincident current memory location addressing of the random access memory.

When an execute store signal is generated at an output from comparator-detector 15, AND circuit 27 receives an input and inhibit drivers 28 associated with the plural planes of memory 12 are appropriately energized in accordance with the sampled quantity and the identifying information to be stored. The inhibit windings (not shown) are associated with inhibit drivers in a conventional manner.

A memory timing unit 29 of conventional construction also receives an input from the output from comparator-detector 15 in response to an execute store signal so that it may appropriately energize the aforementioned inhibit drivers 28 and the X and Y address drivers 30 and 31. X and Y address drivers 30 and 31 operate to appropriately energize selected X and Y address conductors via transformer switch configurations 32X and 32Y. Such a transformer switch configuration may be similar to that shown in Patent No. 2,988,732 of the same inventor. Other address conductor and address driver techniques may be utilized such as that shown in copending application, Serial No. 99,845 filed March 31, 1961, entitled "Energized System" and copending application, Serial No. 91,961, filed February 27, 1961, entitled "Magnetic Memory Instrumentation," which are assigned to the same assignee as the present invention. Shift register 34 functions with transformer switch 32X wherein a high voltage level selects which address conductor is energized by X address driver 30. Similarly, shift register 36 cooperates with transformer switch 32Y so as to select which address conductor is to be energized by Y driver 31.

As set forth hereinabove, it is important as a practical matter that each writing operation in response to an execute store signal store the sampled quantity in a new word location and that these new word locations be selected on a systematic or sequential basis. Assuming for purposes of an example that during the initial writing operation, the sampled quantity (magnitude and identifying information) is to be stored in the memory location at the lower righhand corner of the front view of memory 12, address conductors X1 and Y1 must be selected for proper energization by address drivers 30 and 31, respectively. This is accomplished by initially storing a binary "1" and "0" in shift registers 34 and 36, as shown, so as to cause transformer switches 32X and 32Y to select X1 and Y1. Following the write operation, a pulse is supplied by timing unit 29 to the shift input 62 of shift register 34 so that memory location identified by X2, Y1 is now prepared for receiving a sampled quantity.

On each sampling operation, the binary "1" is successively shifted to the left in shift register 34 so that all of the word locations identified by coordinate Y1 are sequentially selected for a writing operation. When a binary "1" is shifted left out of shift register 34 via recirculation path 37, it is restored in the stage on the right. At the same time, a shift pulse is applied via path 63 to shift register 36 such that the binary "1" shown is moved to the stage associated with coordinate Y2. Following the technique described, each of the coordinate word locations is sequentially addressed for a writing operation so as to store therein a sampled quantity along with the other identifying information which varies from the referenced quantity by a selected amount.

When it is desired to read out the quantitized and compressed analog information, it is merely necessary to go through a conventional read operation at each word location where these word locations are selected in the same sequential manner so that the analog operation pattern sampled by analog-to-digital converter 10 may be reproduced in the same order as stored. Specifically, FIG. 1 shows a sense winding 38 associated with each plane of the memory. These sense windings 38 are shown connected to a multiplex sampler 39 which functions in response to conventional bit gate timing information to serialize the information being read out from the memory location in parallel. The technique for serializing information stored in memory 12 in parallel as shown herein is described in detail in copending application, Serial No. 79,722, filed December 30, 1960, and entitled "Magnetic Memory System" by the same inventor as the present invention and is assigned to the same assignee as the present invention. Sampling amplifier 40 may be of conventional construction and serves the purpose of sampling the signal induced in the selected sense winding 38. By way of example, the output of sampling amplifier 40 is shown connected to a transmitter where the serial information can be transmitted to a remote point and reconverted to analog information by a process which converts the serial binary digital information representing the sampled quantity to an analog quantity and transmits this analog electrical quantity to an output terminal at a time determined by the identifying information also contained in the electrical digital quantity stored in the memory.

The memory elements 9 of memory 12 may be one serial type exemplified by the toroidal core or transfluxor type. However, in order for the output of the memory 12 to be read out in serial form, as shown, the memory element must be of the nondestructive type like the transfluxor. If the memory elements 9 were of the destructive type (toroidal core), the read out from a word location in memory 12 would have to be in parallel form with a separate amplifier 40 for each parallel bit. An additional shift register might be used to serialize the parallel information prior to transmission.

Figure 2:
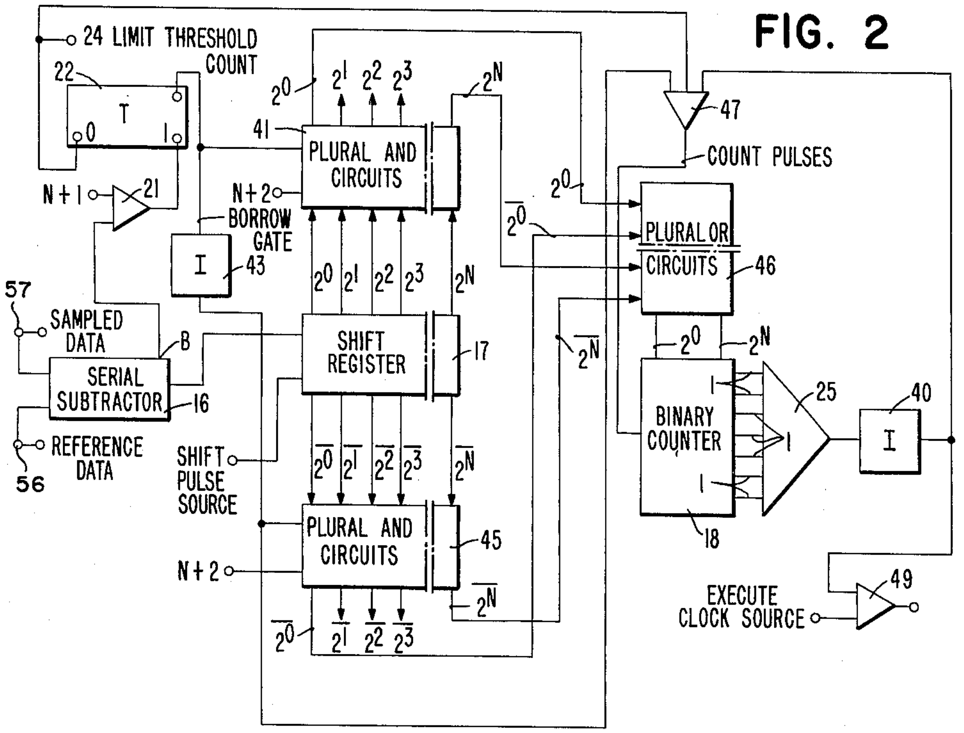
FIG. 2 shows an electrical block diagram of an example of a comparator threshold limit detector which may be used in the system of FIG. 1.

Referring to FIG. 2, the comparator-detector 15 of FIG. 1 is shown in greater detail. The reference quantity in binary serial form is applied via input 56 to a conventional serial subtractor 16. FIG. 13–36 on page 421 and the accompanying description of a textbook entitled "Pulse and Digital Circuits" by Millman and Taub, McGraw-Hill Book Company, Inc., 1956, show a serial subtractor of the type which may be used. The difference quantity is shifted into a conventional shift register 17. As shown, the shift register must be of the type where both the stored binary condition and its complement are available as an electrical output from each stage. Such a shift register is shown in FIG. 13–27, page 413, of the above-identified textbook entitled "Pulse and Digital Circuits."

By way of a practical example, assume that the reference quantity appearing at input 56 is a decimal sixteen represented in serial binary form as 10000 and the sampled quantity is a decimal thirteen represented in serial binary form as 01101. Then, as a result of a subtract operation by serial subtractor 16, a binary 00011 (a decimal three) will be shifted into register 17. In this example, $2^N=2^4$ and the serial binary data contain five bits. Since the reference quantity a decimal sixteen is greater than the sampled quantity a decimal thirteen, a borrow signal will not be present in the serial subtractor 16 as a result of the comparison of the fifth bit $(N+1)$. Therefore, AND circuit 21 does not switch borrow trigger 22 from its normal reset condition so that it does not provide an input to each of AND circuits 41. During this condition, borrow trigger 22 does provide an input to each of AND circuits 45 via inverter 43. Accordingly, on the application of a clock pulse at a time $N+2$ to one input of each of plural AND circuits 45, the 1's complement of the binary number in shift register 17 (11100) is transferred via the plural AND circuits 45 and plural OR circuits 46 to conventional binary counter 18.

Assuming that it is desired to store the sampled quantity in the random access memory 12 if it differs from the reference quantity by a decimal three or a binary 00011, three serial pulses are applied to input terminal 24, representative of the selected threshold. Terminal 24 is connected to both the reset terminal of borrow trigger 22 and one input of AND circuit 47. Since the borrow trigger 22 is already in a reset condition, it is unaffected by the three serial pulses. However, the three serial pulses will pass through AND circuit 47 which is also receiving an up level from inverters 43 and 40. The three serial pulses will be applied to counter 18 which was storing in serial binary form a 11100. The three serial pulses will fill up the counter 18 so it stores a binary 11111. Under this condition, AND circuit 25 provides an output signal and the output of inverter 40 goes to a down level. Accordingly, the execute clocking pulse which is applied to AND circuit 49 will not generate an execute store signal. This corresponds to the desired operation inasmuch as the sampled quantity did not vary in magnitude from the reference quantity in excess of a decimal three or a binary 00011.

Had the threshold been a decimal two or a binary 00010, the two serial pulses applied to terminal 24 would not have filled up the counter 18 leaving it storing a binary 11110. AND circuit 25 would not have had an output. Inverter 40 would have had an up level at its output and the execute clock pulses would have caused AND circuit 49 to generate an execute store signal indicated that the sampled quantity a decimal thirteen or a binary 01101 different from the reference quantity by an amount in excess of a decimal two. This execute store signal would initiate a store operation in random access memory 12 and an updating of temporary register 13.

Had the threshold been a decimal four or a binary 00100, the four serial pulses applied to terminal 24 would have filled up counter 18 as a result of the third serial pulse. AND circuit 25 would have had an up level at its output. Inverter 40 would have had a down level at its output and the fourth serial pulse applied at terminal 24 could not pass through AND circuit 47.

On the other hand, assume that the reference quantity appearing at input 56 is a decimal thirteen represented in serial binary form as a 01101 and the sampled quantity is a decimal sixteen represented in serial binary form as 10000. Then, as a result of a subtract operation by serial subtractor 16, a binary 11101 (the 2's complement of a decimal three) will be shifted into register 17, since the reference quantity, a decimal thirteen, is less than the sampled quantity, a decimal sixteen. Also, a borrow signal will be present in the serial subtractor 16 as a result of the comparison of the fifth bit $(N+1)$. Therefore, AND circuit 21 does in response to a clocking pulse at bit time $(N+1)$ switch borrow trigger 22 to its set condition so that an up level is present at the trigger output and plural AND circuits 41 are each receiving an input. During the set condition of borrow trigger 22, it does not provide an input to each of AND circuits 45 via inverter 43. Accordingly on the application of a clock pulse at time $N+2$ to one input of each of plural AND circuits 41, the binary number in shift register 17 (11101) is transferred via the plural AND circuits 41 and plural OR circuits 46 to conventional binary counter 18.

Assuming that it is desired to store the sampled quantity in the random access memory 12 if it differs from the reference quantity by a decimal three or a binary 00011, three serial pulses are applied to input terminal 24 representative of the selected threshold which must be exceeded before an execute store operation is to be initiated. Terminal 24 is connected to both the reset terminal of borrow trigger 22 and one input of AND circuit 47. Moreover, as long as borrow trigger 22 remains in its reset condition, AND circuit 47 will not pass the serial pulses applied to input terminal 24 because the output of inverter 43 is determined by the condition of the trigger. Therefore, the first of the three serial pulses applied to terminal 24 is utilized to reset the borrow trigger 22 so that the output of inverter 43 goes to an up level and AND circuit 47 can pass two serial pulses to counter 18. This blocking of the first serial pulse from counter 18 makes allowance for the fact that counter 18 is storing the 2's complement of the difference between the reference quantity and the sampled quantity instead of the 1's complement as the previous example where the reference quantity exceeds the sampled quantity.

The two serial pulses which do pass through AND circuit 47 are sufficient to fill up counter 18 (initially storing a binary 11101) so that it stores a binary 11111. Under this condition, AND circuit 25 provides an output signal and the output of inverter 40 goes to a down level. Accordingly, the execute clocking pulse which is applied to AND circuit 49 will not generate an execute store signal. This corresponds to the desired operation inasmuch as the sampled quantity did not vary in magnitude from the reference quantity in excess of a decimal three corresponding to the three serial pulses applied to terminal 24.

Had the threshold been a decimal two or a binary 00010, the two serial pulses applied to terminal 24 would not have filled up the counter 18 leaving it storing a binary 11110. This is true even though the counter 18 initially stored a binary 11101 representing the 2's complement of the difference in the sampled and referenced quantities. Because the initial pulse applied to terminal 24 is used to reset borrow trigger 22 so that AND circuit 47 will be open for the second serial pulse for optimum operation, borrow trigger 22 should be responsive to the trailing edge only of the first serial pulse applied to terminal 24. Since, when the threshold is a decimal two, the counter is not filled up with all binary 1's, AND circuit 25 will not have an output. Inverter 40 will have an up level at its output terminal and the execute clock pulse applied to AND circuit 49 will generate an execute store signal indicating that the sampled quantity is a decimal sixteen or a binary 10000 different from the reference quantity by an amount in excess of decimal two. This execute store signal will initiate a store operation in random access memory 12 and updating of temporary register 13.

Had the threshold been a decimal four or a binary 00100, the four serial pulses applied to terminal 24 would have filled up counter 18 as a result of the third serial pulse. AND circuit 25 would have had an up level at its output. Inverter 40 would have had a down level at its output and the fourth serial pulses applied at terminal 24 could not pass through AND circuit 47. Finally, as in the case when the threshold was a decimal three, the execute clock pulse applied to AND circuit 49 would not generate an execute store signal.

In summary, the comparator-detector of FIG. 2 effectively fills counter 18 with the complement of their difference whether the reference quantity is bigger than the sampled quantity or vice versa. The borrow trigger 22 being responsive to both the limit threshold 24 and an end around borrow output of serial subtractor 16 coacts with other circuitry so as to overcome the problems associated with the difference between a 2's complement and a 1's complement in a subtraction operation.

Figure 3:
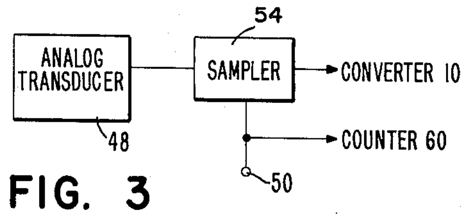
FIG. 3 shows an electrical block diagram of one type of analog channel which may serve as an input to the system of FIG. 1.

Referring to FIG. 3, there is shown one type of input circuit to the system of FIG. 1. Therein, the output of an analog transducer 48 is applied to a sampler 54. The construction of the analog transducer 48 can vary widely as determined by the system application. The only requirements are that it provides an electrical signal which it is desired to sample for purposes of compressing and storing for later use in accordance with the operation of the system of FIG. 1 as described hereinabove. The sampler 54 may be of conventional design exemplified by a pulse responsive relay or semiconductor switch having a normally open condition.

It is, of course, necessary to provide a time reference indicative of the point in time at which each analog sample is taken. If a sampler 54 is energized by an accurate sampling pulse source connected to terminal 50, this sampling pulse source may also be used to cooperate with the counter 60 shown in FIG. 1.

Figure 4:
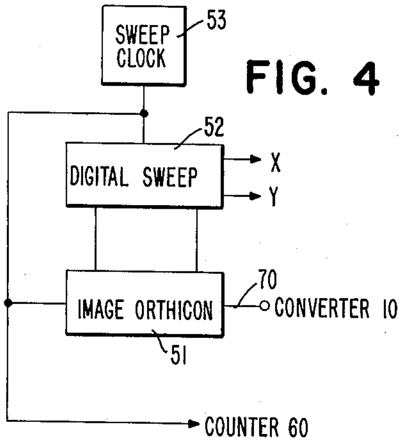
FIG. 4 shows an electrical block diagram of another type of analog channel which may serve as an input to the system of FIG. 1.

Referring now to FIG. 4, the analog transducer is the output of a conventional image orthicon system 51. As those skilled in the art know, the image orthicon tube is conventionally scanned so as to generate an analog pulse amplitude at successive points in time commensurate with the intensity of light falling on the face of the tube. Accordingly, successive analog pulses are generated with the passage of time at an output terminal 70 of the system 51 having an amplitude corresponding to the scene being scanned by the image orthicon system. Sweep circuits such as the X, Y sweep circuitry shown in the block 52 are effective to successively sample each point in the field of view of the image orthicon system. In order to generate a signal commensurate with the time or position identification of each analog pulse produced in the output terminal 70, a digital sweep generator 52 also generates X and Y digital information which may serve as inputs directly to AND circuits 27 of FIG. 1. Alternatively, since sweep clock generator 53 serves as a timing source for both the digital sweep generator 52 and the image orthicon system 51, the clock pulse of generator 53 may be applied to counter 60.

While the reference quantity has been shown in the systems of FIGS. 1 and 2 as being compared with the sampled quantity in serial fashion, it should be clear that this comparison may be accomplished in parallel utilizing circuitry designed for that specific purpose in accordance with known circuit techniques without departing from the broad teachings of the present invention. Other means for comparing and threshold limit detecting could be used in place of the means shown in FIG. 2. FIG. 1 shows the random access memory 12 as being of the coincident current addressed type. It should be clear that it could have also been of the word organize addressed type when the other design considerations make that type preferable. In addition, while the read instruction of random access memory 12 is shown as of the serial type to accommodate known telemetry technieques, it should be clear that if bulk storage such as a multichannel tape unit is immediately available, the readout from the memory could be of the serial parallel or parallel type. The readout circuitry can be adapted to the particular system requirement of each practical embodiment.

In order to simplify the description of the teachings of the present invention, there are instances where timing circuits and other practical circuitry known to those skilled in the art have not been shown.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for compressing redundant information by storing samples of the redudant information only when significant changes in information occurs comprising a memory for storing samples of the redundant information along with identifying information for identifying the samples, a comparison means for comparing the most recently stored sample with the redundant information as it is received, deviation information generated by said comparison means for indicating the deviation of the currently received information from the most recently stored sample, detecting means responsive to said deviation information for detecting significant changes in the redundant information, an execute signal generated by said detecting means when the deviation information is in excess of a selected threshold, said memory being responsive to said execute signal so as to store the currently received information as a new sample of the redundant information and also to store identifying information for identifying the new sample.

2. A system for compressing redundant information by storing samples of the redundant information only when significant changes in information occur comprising a memory for storing samples of the redundant information along with identifying information for identifying the samples, a temporary storage means for storing as a reference quantity the last sample stored in said memory, a comparison means for comparing the reference quantity with the redundant information as it is received, difference information generated by said comparison means for indicating the magnitude of the difference between the reference quantity and the currently received information, a detecting means responsive to said difference information for detecting significant changes in the redundant information, an execute signal generated by said detecting means when the magnitude of said difference information is in excess of a selected threshold, said memory being responsive to said execute signal so as to store the currently received information as a new sample of the redundant information and also to store identifying information for identifying said new sample, and said temporary storage means being responsive also to said execute signal so as to update the reference quantity with the new sample.

3. A system for compressing redundant information by storing samples of the redundant information only when significant changes in information occur comprising a memory for storing time related samples of the redundant digital information along with time-identifying digital information for identifying the samples, subtracting means for taking the difference between the redundant digital information, as it is received, and the most recently stored time related sample, digital difference information generated by said subtracting means for indicating the magnitude of the difference between the currently received redundant digital information and the most recently stored time related sample, binary counter means responsive to said digital difference information for adding a selected digital threshold to said digital difference information, an execute signal generated by said binary counter means when said counter means is filled to capacity by the addition of the selected digital threshold to said digital difference information, and said memory being responsive to said execute signal so as to store the currently received redundant digital information as a new time related sample and also to store time-identifying digital information for identifying the new time related sample.

4. An electrical digital system for compressing redundant information by storing samples of the redundant information only when significant changes in information occur comprising a source of redundant digital information to be compressed and stored, a memory for storing time related samples of the redundant digital information along with time identifying digital information for identifying the occurrence of each time related sample, a temporary storage means for storing as a reference quantity the last time related sample stored in said memory, subtracting means for taking the difference between the redundant digital information, as it is received, and the reference quantity, digital difference information generated by said subtracting means for indicating the magnitude of the difference between the currently received redundant digital information and the reference quantity, a borrow signal generated by said subtracting means indicative of a borrow deficiency in said digital difference information, compensating means emitting serial pulses commensurate with a selected threshold and responsive to said borrow signal for compensating the borrow deficiency in said digital difference information by blocking the first serial pulse to be emitted, binary counter means responsive to said digital difference information and the serial pulses emitted by said compensating means for adding the compensated selected threshold to said digital difference information, an execute signal generated by said binary counter means when said counter means is filled to capacity by the addition of said digital difference information to the compensated selected digital threshold, said memory being responsive to said execute signal so as to store the currently received redundant digital information as a new time related sample and also to store time-identifying digital information for identifying the occurrence of each time related sample, and said temporary storage means being responsive to said execute signal and the currently received redundant digital information so as to update the reference quantity with the new time related sample.

5. An electrical digital information system as set forth in claim 4 wherein said source comprises an analog sampled electrical quantity cooperating with an analog-to-digital converter.

6. The electrical digital information system of claim 4 wherein said memory is a random access memory and in response to said execute signal stores the new time related sample along with accompanying time identifying information in the word locations of said memory in a sequential manner.

7. A comparator-detector circuit comprising a serial subtractor having two input terminals, an output terminal for generating difference information indicative of the difference between the signals on the two input terminals and an end around borrow terminal for generating a borrow signal; a borrow control means responsive to the borrow signal from said end around borrow terminal for adjusting a selected threshold to compensate for a borrow deficiency in the difference information; binary counter means responsive to the difference information from said output terminal and the adjusted selected threshold from said borrow control means so that when a source of serial reference information applied to one input of said subtractor differs from a source of serial sampled information applied to the other input of said subtractor by an amount exceeding the selected threshold an execute signal is generated by said counter means.

8. A comparator-detector circuit for detecting significant variations in redundant information comprising a subtractor for taking the difference between two digital inputs, digital difference information generated by said subtractor indicative of the difference between the two digital inputs, a borrow signal also generated by said subtractor indicative of a borrow deficiency in said digital difference information, compensating means emitting serial pulses commensurate with a selected threshold and responsive to said borrow signal for compensating the borrow deficiency in said digital difference information by blocking the first serial pulse, binary counter means responsive to said digital difference information and the serial pulses emitted by said compensating means so that when a source of reference information applied to one input of said subtractor differs from a source of sampled information applied to the other input of said subtractor by an amount exceeding the selected threshold an execute signal is generated by said counter means.

9. A comparator-detector circuit for detecting significant variations in redundant information comprising a comparison means for comparing a reference quantity with the redudant information as it is received, deviation information generated by said comparison means indicative of the deviation of the currently received redundant information from the reference quantity, detecting means responsive to said deviation information for detecting significant changes in the redundant information, and an execute signal generated by said detecting means, when said deviation information is in excess of a selected threshold, indicative of a significant variation in the redundant information.

10. A comparator-detector circuit for detecting significant variations in redundant digital information comprising subtracting means for taking the difference between a reference quantity and the redundant digital information as it is received, digital difference information generated by said subtracting means indicative of the magnitude of the difference between the currently received redundant digital information and the reference quantity, binary counter means responsive to said digital difference information for adding a selected digital threshold to said digital difference information, and an execute signal indicative of a significant variation in the redundant digital information generated by said binary counter means when said counter means is filled to capacity by the addition of said digital difference information to the selected digital threshold.

11. A comparator-detector circuit for detecting significant variations in redundant digital information comprising a subtracting means for taking the difference between a reference quantity and the redundant digital information as it is received, digital difference information generated by said subtracting means indicative of the magnitude of the difference between the currently received redundant digital information and the reference quantity, a borrow signal generated by said subtracting means indicative of the arithmetic polarity of the digital difference information, borrow control means responsive to said borrow signal for controlling a selected digital threshold so as to bring the selected digital threshold into proper correspondence with the arithmetic polarity of the digital difference information, binary counter means responsive to said borrow control means and said digital difference information for adding the controlled selected digital threshold to said digital difference information, an execute signal generated by said binary counter means for indicating a significant variation in the redundant digital information if said counter means is filled to capacity by the addtion of said digital difference information to the controlled selected digital threshold.

12. A comparator-detector circuit for detecting significant variations in redundant digital information comprising a digital subtractor responsive to the redundant digital information and reference digital information for generating the complement of the digital difference between the reference and the redundant digital information, digital accumulating means responsive to the complement if the digital difference from said digital subtractor and also responsive to a selected digital threshold for adding the threshold to the complement and generating an execute signal indicative of a significant variation in the redundant digital information if the sum of the complement and the selected threshold fills said accumulating means to its capacity.

13. A comparator-detector circuit for generating an execute signal when redundant digital information in serial form differs from reference digital information in serial form by an amount in excess of a threshold comprising a serial subtractor responsive to the redundant digital information in serial form and the reference digital information in serial form for taking the difference between the redundant and reference information, digital difference information generated by said serial subtractor indicative of the complement of the difference between the redundant and the reference digital information, a borrow signal generated by said serial subtractor indicative of a borrow deficiency in said digital difference information, adjusting means responsive to said borrow signal to adjust a selected digital threshold so that the borrow deficiency in said digital difference information will be compensated for in the adjusted selected digital thresold, accumulating means responsive to said difference information and the adjusted selected digital threshold so as to generate an execute signal if the sum of said digital difference information and the adjusted selected digital threshold is greater than the capacity of said accumulating means.

14. A comparator-detector circuit for generating an execute signal when redundant digital information in serial form differs from reference digital information in parallel form by an amount in excess of a threshold comprising the circuit of claim 13 and in addition a serializing means responsive to the reference digital information in parallel form and responsive also to a synchronizing signal in synchronism with said redundant digital information, said serializing means converting the reference digital information into serial form in synchronism with the redundant digital information in serial form and supplying the reference digital information in serial form to said serial subtractor.

15. A system for comressing redundant information by storing samples of the redundant information only when significant changes in information occur comprising a source of redundant digital information to be compressed and stored, redundant digital information generated by said source in both serial and parallel form, a synchronizing signal generated by said source synchronized with the serial form of said redundant digital information, a memory for storing time related samples of said redundant digital information along with time-identifying digital information for identifying the occurrence of each time related sample, a temporary storage means for storing as reference digital information the last time related sample stored in said memory, serializing means responsive to the parallel form of the reference digital information in said temporary storage means and also responsive to said synchronizing signal for converting the reference digital information into serial form in synchronism with the redundant digital information in serial form, a serial subtractor responsive to the redundant digital information in serial form and the reference digital information in serial form for taking the difference between the redundant and the reference information, digital difference information generated by said serial subtractor indicative of the complement of the difference between the redundant and reference digital information, a borrow signal generated by said serial subtractor indicative of an end around borrow deficiency in said digital difference information, adjusting means responsive to said borrow signal to adjust a selected digital threshold so that the end around borrow deficiency in said digital difference information will be compensated for in the adjusted selected digital threshold, accumulating means responsive to said difference information and the adjusted selected digital threshold for adding the adjusted selected digital threshold to the digital difference information, and an execute signal generated by said accumulating means if said accumulating means is filled to capacity by the addition of the adjusted selected digital threshold to the digital difference information, said memory being responsive to said execute signal so as to store the currently received redundant digital information as a new time related sample and also to store the time identifying digital information for identifying the occurrence of each time related sample, said temporary storage means being responsive to said execute signal and the currently received redundant digital information so as to update the reference quantity with the new time related sample.

References Cited by the Examiner

UNITED STATES PATENTS

| | | | |
|---|---|---|---|
| 2,900,620 | 8/1959 | Johnson | 340—149 |
| 2,959,768 | 11/1960 | White et al. | 340—149 |
| 3,030,609 | 4/1962 | Albrecht | 340—172.5 |
| 3,077,580 | 2/1963 | Underwood | 340—172.5 |

ROBERT C. BAILEY, *Primary Examiner.*

MALCOLM A. MORRISON, *Examiner.*